United States Patent Office 3,058,321
Patented Oct. 16, 1962

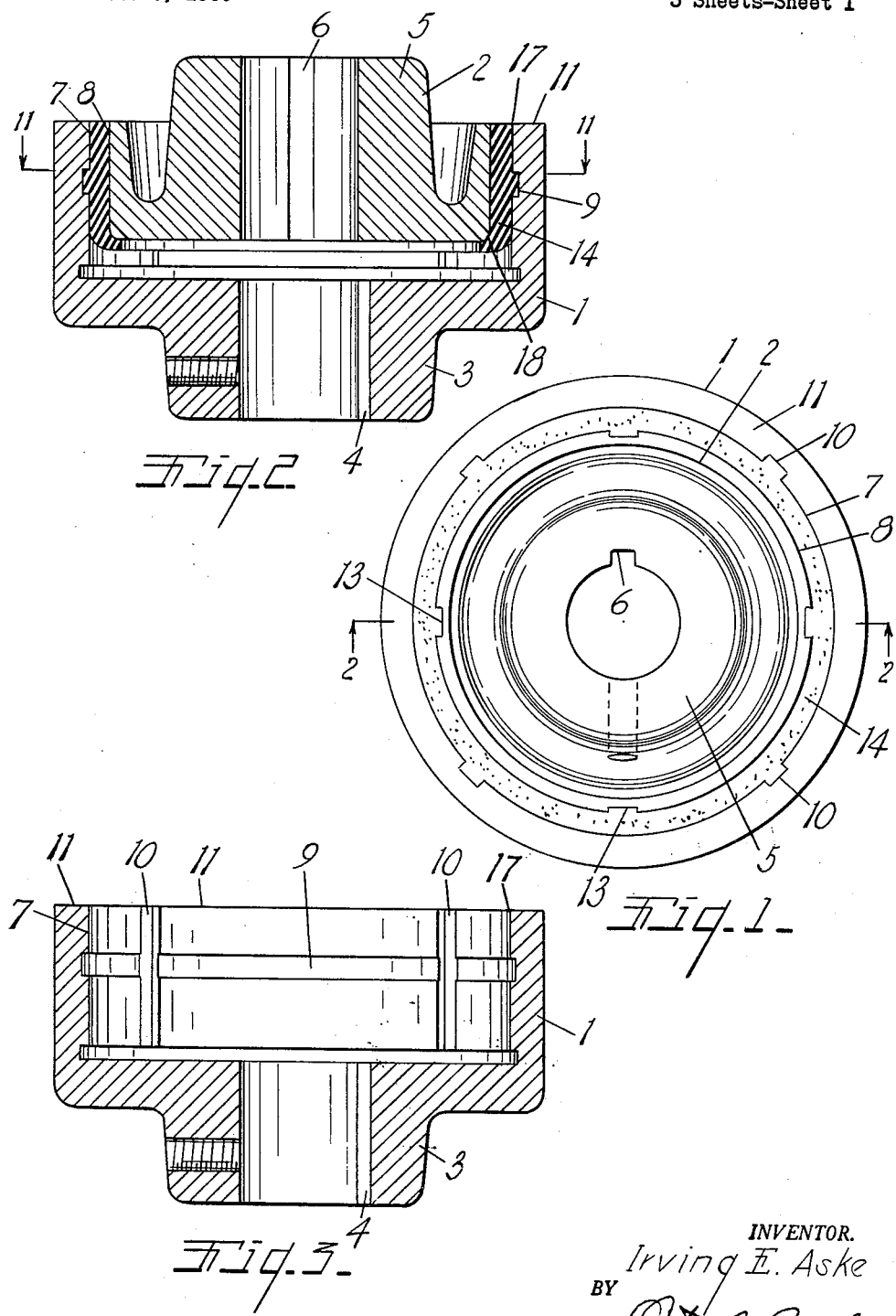

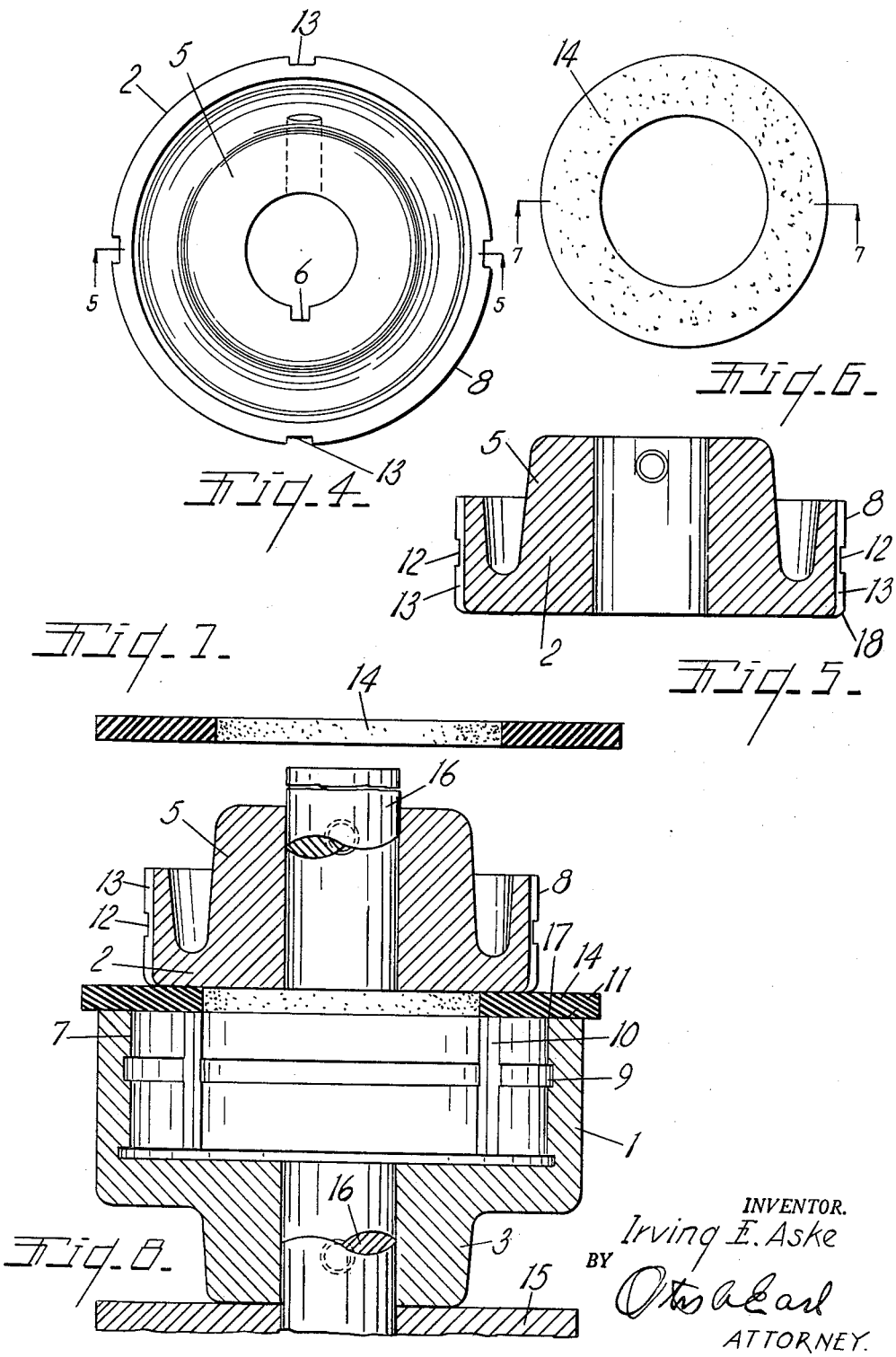

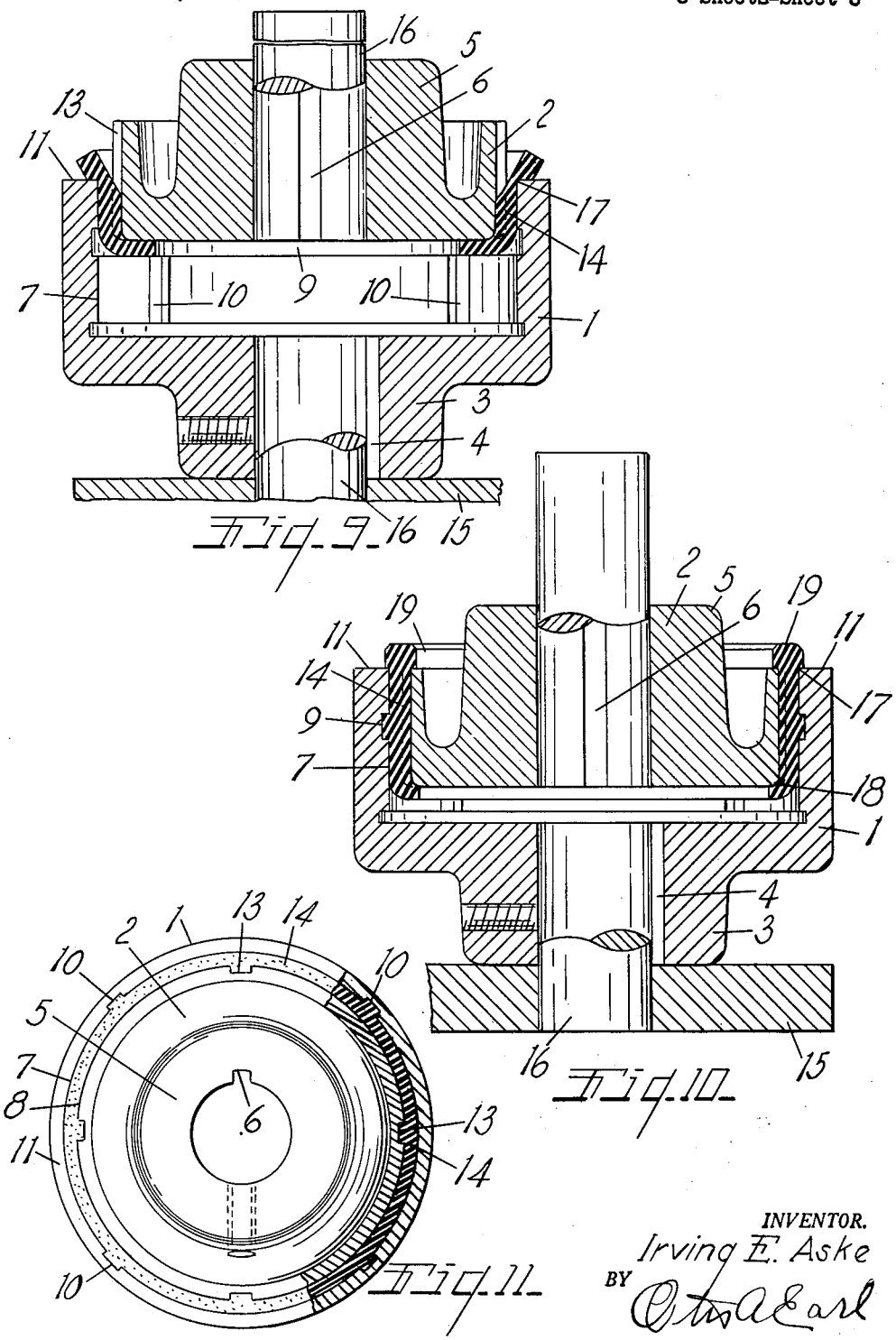

3,058,321
POWER TRANSMITTING COUPLING AND
METHOD OF PRODUCING SAME
Irving E. Aske, St. Petersburg, Fla.
(440 46th Ave., St. Petersburg Beach 6, Fla.)
Filed Oct. 3, 1960, Ser. No. 60,023
5 Claims. (Cl. 64—11)

This invention relates to couplings for driving and driven members and the method of producing same.

The principal objects of this invention are:

First, to provide a coupling that will transmit a relatively large amount of horsepower and in proportion to its size eliminate vibration from the power source.

Second, to provide a coupling that will transmit torque from a source such as an internal combustion engine without the torque impulses resulting in vibration or flutter of the members of the coupling.

Third, to provide a coupling that will by means of or through an annular elastic member of rubber or the like disposed between the driving and driven members dampen or absorb shock loads.

Fourth, to provide a coupling having these advantages which will translate power through driving to driven shafts that are substantially misaligned.

Fifth, to provide a coupling having these advantages which is assembled as a unit and is easily installed.

Sixth, to provide a method of producing a coupling having these advantages which enable rapid production and a uniform positioning of the vibration absorbing material between its driving and driven members.

Seventh, to provide a method of assembling the parts of a vibration absorbing coupling comprising concentrically disposed driving and driven members connected by a shock absorbing resilient intermediate member which is securely anchored to both the driving and the driven members and without tearing or rupturing the intermediate member which in its original form is in the form of an annular flat disk of uniform thickness.

Eight, to provide a method of manufacturing shock absorbing couplings which may be very economically practiced.

Objects relating to details and economies of the invention will appear from the description to follow. The invention is defined and pointed out in the claims.

A preferred embodiment of the invention is illustrated in the accompanying drawing, in which:

FIG. 1 is an end view of a coupling embodying my invention.

FIG. 2 is a vertical section on a line corresponding to line 2—2 of FIG. 1.

FIG. 3 is a vertical section corresponding to that of FIG. 2 of the outer coupling member.

FIG. 4 is an end view of the inner coupling member.

FIG. 5 is a sectional view of the inner coupling member on a line corresponding to line 5—5 of FIG. 4.

FIG. 6 is a plan view of the intermediate coupling member blank.

FIG. 7 is a cross section thereof on a line corresponding to line 7—7 of FIG. 6.

FIG. 8 is a vertical section illustrating one step in the assembling method of this application.

FIG. 9 is a view corresponding to that of FIG. 8 showing a succeeding step of the method.

FIG. 10 is a corresponding section to FIGS. 8 and 9 showing the final assembly prior to the removal of the projecting end of the intermediate member.

FIG. 11 is an end view of the coupling partially in section, further illustrating structural details and the relation of the three members of the coupling.

The embodiment of my invention illustrated is well adapted for the transmitting of power from an internal combustion engine or other source of power and to absorb the vibrations incident thereto or produced thereby so that they are not translated to the driven member and further to provide a coupling having these advantages which in proportion to its size is capable of transmitting a high degree of horsepower at relatively high speeds without vibration.

The embodiment of my invention illustrated comprises driving and driven members designated generally by the numerals 1 and 2 but it should be understood that either of these may be the driving member.

The member 1 is referred to as an outer member and the number 2 as an inner member because these members are concentrically disposed in radially spaced relation to each other. The member 1 is provided with a hub 3 which is adapted to be splined to a shaft, it being internally grooved at 4. The member 2 comprises the hub 5 which is grooved at 6 to receive a spline. The member 1 is provided with an inwardly facing cylindrically curved face or surface 7 and the member 2 with an outwardly facing cylindrically curved face 8, the member 2 being of substantially less diameter than the member 1 so that its peripheral face or surface 8 is radially spaced from the surface 7 of the outer member as is clearly illustrated in the drawing. The hubs are shown in axial alignment in the drawings but one of the accomplished objects of the applicant's invention is to provide a structure in which the axis of one coupling member may be at an angle relative to the axis of the other member.

The coupling member 1 is provided with an annular groove 9 and with angularly spaced axial inwardly facing grooves 10 in its face, the grooves 10 extending to the outer end edge 11 and inwardly across the grooves 9. The member 2 is provided with an annular outwardly facing groove 12 and with angularly spaced, axially extending outwardly facing grooves 13 desirably corresponing in number to the grooves 10 of the outer member and disposed in staggered relation thereto.

The power transmitting vibration absorbing coupling member 14 is disposed between the opposed faces of the outer and inner members in frictional clutching engagement therewith and with portions of the opposed surfaces thereof within the grooves as is illustrated in FIGS. 1, 2, 10 and 11 in which the parts are illustrated in fully assembled relation to each other. The rubber intermediate member 14 is under stretch tension or stress as distinguished from being merely under compression or pressure distortion. The member 14 before assembly is in the form of an annular disk of uniform thickness and of a thickness which greatly exceeds the radial space or distance between the members 1 and 2, as illustrated in FIGS. 7 and 8.

Where considerable angular flexibility is desired between the members 1 and 2, the applicant prefers to use pure gum rubber which has a stretchability ratio of approximately 800%, however where the coupling is to be used to deliver relatively high horse power, compound rubber can desirably be used having a stretchability ratio ranging from 300 to 500%. As an example, in the making of a coupling in which the member 1 has an inner diameter of approximately 4½ inches, the outer diameter of the inner member 2 may desirably be of the order of 4¼ inches thereby providing a ⅛ inch clearance between the two members to receive the rubber coupling element. A coupling, such as illustrated, having an axial width of 1¼ inches is capable of transmitting more than 100 H.P. at 3600 r.p.m. This is mentioned as an example and to facilitate the understanding of a practical adaptation of the applicant's invention. Increasing the space between the members 1 and 2 adds to the angular flexibility of a coupling. The thickness of the rubber coupling member 14 of the embodiment illustrated is approximately ¼ of an inch and it may desirably have an inner diameter of 2¾ inches and an outer diameter of 5⅜ inches.

The above figures are given as a practical example and the embodiment illustrated is a practical embodiment or adaptation of my invention.

To further illustrate, the applicant has as stated found it highly practical where the rubber is stretched at least 100%.

In practicing the method, I illustrate certain assembling steps which include a supporting device consisting of a base member 15 having an upwardly projecting spindle 16 of such diameter that the hubs of the coupling members 1 and 2 have a sliding fit thereon as is illustrated in FIGS. 8 and 9 with the outer coupling member 1 positioned upon the support; the annular rubber disk 14 is superimposed or laid upon the upper edge 11 thereof as is illustrated in FIG. 8. It should be noted that the member 14 is in no wise secured to the coupling member 1 but merely rests thereon and concentrically thereof and projects substantially inwardly therefrom and desirably outwardly beyond the coupling member. The coupling member 2 is then positioned on the spindle 16 as illustrated in FIG. 8 and the members 1 and 2 subjected to axial thrust relative to each other until they are in completely assembled nested relation as is shown in FIG. 10. As is illustrated in FIG. 8 the member 14 merely rests upon the end 11 of the member 1 and is free to move relative thereto and when the member 5 is actuated the member 14 is pinchingly or clutchingly engaged with the sharp inner edge 17 of the member 1 and is so engaged during the assembly as is illustrated in FIG. 9 so that the member 14 is stretched into assembled relation as is illustrated in FIGS. 10 and 2. The inner edge 18 of the member 2 is curved so that the rubber can slip or slide over the curved edge 18 which extends through the bottoms of the grooves 13 which permits the rubber to slip over the edge as the inner and outer members are forced into their final assembled relationship to each other. During this step, the inner diameter of the member 14 greatly increases as the rubber is stretched to fill up the space between the members 1 and 2. To facilitate this stretching of the rubber during this assembling step, it is desirable to apply a light coating of lubricant to the top or outer side of the member 14.

When the parts are in completely assembled relationship as is shown in FIG. 10, there is a substantial portion 19 of the member 14 which projects from the ends of the assembled members 1 and 2. This projecting portion 19 is then cut off and the assembling operation is complete.

I have not illustrated a press or other means for use in the assembling as various types of presses, or even a vise, might be used in the assembling operation.

The rubber element 14 expands into locking retaining engagement with the grooves 9 and 10 of the member 1 and with the grooves 12 and 13 of the member 2 and in addition to this anchoring engagement, the member 14 has close frictional gripping engagement with the opposed surfaces of the inner and outer members and the result is that the resilient coupling member is capable of transmitting very heavy torsional loads thereon in proportion to the size of the coupling and at the same time it effectively absorbs the vibrations to which one of the members may be subjected so that it is not translated to the other and it not only prevents the translation of vibration but it substantially eliminates sound that would otherwise result.

By positioning the member 14 as is illustrated and without clamping connection to either of the inner or outer members, it is not subjected to substantial tearing stress during assembly and inasmuch as these members 1 and 2 are guided axially and centered, their centered relation is maintained in the assembled structure and the stress to which the rubber is subjected is uniform throughout.

I have illustrated and described my invention in a highly practical commercial embodiment thereof and means for the practise of my method which are highly practical. I have not illustrated other embodiments or apparatus for practising the method as it is believed this disclosure will enable those skilled in the art to embody or adapt my invention as may be desired.

Having thus described the invention, what is claimed as new and desired to secure by Letters Patent is:

1. A power transmitting vibration absorbing coupling including driving and driven members having concentrically disposed radially spaced body portions having opposed cylindrical curved faces, the face of the outer member facing inwardly and having an annular centrally disposed inwardly facing groove therein and having a plurality of angularly spaced inwardly facing axial grooves opening at the outer end of the body member and to and extending inwardly from said annular groove, the inner member having an outwardly facing annular groove and a plurality of outwardly facing angularly spaced axial grooves opening to both ends thereof and disposed in staggered relation to the axial grooves of said outer member, and a power transmitting vibration absorbing coupling member of rubber disposed between the opposed faces of said outer and inner members in frictional clutching power transmitting engagement with the opposed surfaces thereof and with said grooves therein, said coupling member being under such degree of distortion stress that it is substantially non-stretchable torsionally thereof under power transmitting use loads of the coupling while absorbing vibration of one member relative to the other and permitting relative tilting of the axes of the members relative to each other.

2. A power transmitting vibration absorbing coupling including driving and driven members having concentrically disposed radially spaced body portions having opposed cylindrical faces, the face of the outer member facing inwardly and having a plurality of angularly spaced inwardly facing axial grooves opening at the outer end of the body member, the inner member having a plurality of outwardly facing angularly spaced axial grooves opening to both ends thereof and disposed in staggered relation to the axial grooves of said outer member, and a power transmitting vibration absorbing coupling member of resilient yielding material disposed between the opposed faces of said outer and inner members in frictional clutching power transmitting engagement with the opposed surfaces thereof and with said grooves therein, said coupling member being under such degree of distortion stress that it is substantially non-stretchable torsionally thereof under power transmitting use loads of the coupling while absorbing vibration of one member relative to the other and permitting relative tilting of the axes of the members relative to each other.

3. A power transmitting vibration absorbing coupling including driving and driven members having concentrically disposed radially spaced body portions having opposed radially spaced cylindrically curved faces, the face of the outer member facing inwardly and having an annular inwardly facing groove therein and a plurality of angularly spaced inwardly facing axially extending grooves intersecting the said annular groove, the inner member having an outwardly facing annular groove therein disposed in opposed relation to the annular groove of said outer member and having a plurality of outwardly facing angularly spaced axially extending grooves disposed in staggered relation to the axial grooves of said outer member, and a power transmitting vibration absorbing coupling member of resiliently yielding material disposed between said inner and outer members in engagement with the opposed curved surface thereof and with said grooves therein, said coupling member being under such distortion stress that in transmitting use loads of the coupling it is substantially non-stretchable torsionally thereof while acting to absorb vibration of one member relative to the other and to permit a substantial degree of tilting of the axis of one member relative to the axis of the other.

4. A power transmitting vibration absorbing coupling including driving and driven members having concentrically disposed radially spaced body portions having opposed cylindrically curved faces, the face of the outer member facing inwardly and having a plurality of angularly spaced inwardly facing axially extending grooves therein, the inner member having a plurality of outwardly facing angularly spaced axially extending grooves disposed in staggered relation to the axial grooves of said outer member, and a power transmitting vibration absorbing coupling member of resiliently yielding material disposed between said inner and outer members in engagement with the opposed curved surface thereof and with said grooves therein, said member being under such distortion stress in transmitting use loads of the coupling that it is substantially non-stretchable torsionally thereof while acting to absorb vibration of one member relative to the other and to permit a substantial degree of tilting of the axis of one member relative to the axis of the other.

5. A power transmitting vibration absorbing coupling including driving and driven members having concentrically disposed radially spaced body portions having opposed cylindrically curved faces, the face of the outer member facing inwardly and having a plurality of angularly spaced inwardly facing axially extending grooves therein, the inner member having a plurality of outwardly facing angularly spaced axially extending grooves disposed in staggered relation to the axial grooves of said outer member, and a power transmitting vibration absorbing coupling member of resiliently yielding material disposed between said inner and outer members in engagement with the opposed curved surface thereof and with said grooves therein, said member being under such distortion stress in transmitting use loads of the coupling that it is substantially non-stretchable torsionally thereof while acting to absorb vibration of one member relative to the other, at least one of said members having an annular groove therein intersecting its axial grooves and with which said resilient yielding material is in engagement.

References Cited in the file of this patent
UNITED STATES PATENTS

| | | |
|---|---|---|
| 1,960,688 | Archer | May 29, 1934 |
| 2,004,712 | Thiry | June 11, 1935 |
| 2,739,462 | Wincenciak | Mar. 27, 1956 |
| 2,763,055 | Hardy | Sept. 18, 1956 |
| 2,795,037 | Haushalter | June 11, 1957 |
| 2,822,676 | Horovitz | Feb. 11, 1958 |
| 2,852,286 | Guy et al. | Sept. 16, 1958 |
| 2,927,674 | Everitt | Mar. 8, 1960 |